US007552174B1

United States Patent
Cramer et al.

(10) Patent No.: US 7,552,174 B1
(45) Date of Patent: Jun. 23, 2009

(54) METHOD FOR AUTOMATICALLY ENABLING UNIFIED COMMUNICATIONS FOR WEB APPLICATIONS

(75) Inventors: Keith D. Cramer, Pine Island, MN (US); Donald A. Morrison, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,982

(22) Filed: May 16, 2008

(51) Int. Cl.
G06F 15/16 (2006.01)
G06F 15/173 (2006.01)

(52) U.S. Cl. .................. 709/203; 709/206; 709/224; 709/228

(58) Field of Classification Search .............. 709/203, 709/206, 224, 228; 715/234; 704/270.1
See application file for complete search history.

(56) References Cited

U.S. PATENT DOCUMENTS

| | | | |
|---|---|---|---|
| 6,779,154 B1 * | 8/2004 | Nussbaum et al. | 715/234 |
| 6,990,514 B1 * | 1/2006 | Dodrill et al. | 709/206 |
| 7,346,840 B1 * | 3/2008 | Ravishankar et al. | 715/234 |
| 2002/0087325 A1 * | 7/2002 | Lee et al. | 704/270.1 |
| 2002/0124057 A1 | 9/2002 | Besprovan | |
| 2003/0123622 A1 | 7/2003 | Gifford et al. | |
| 2006/0047767 A1 * | 3/2006 | Dodrill et al. | 709/206 |
| 2007/0061468 A1 | 3/2007 | Kelly et al. | |

FOREIGN PATENT DOCUMENTS

| | | |
|---|---|---|
| WO | 2005057891 | 6/2005 |
| WO | 2008045782 | 4/2008 |

\* cited by examiner

*Primary Examiner*—Quang N. Nguyen
(74) *Attorney, Agent, or Firm*—King & Spalding LLP (57) ABSTRACT

Enabling unified communications capabilities in applications without the requirement to modify application programs to enable connecting to a unified communications capabilities infrastructure. Specifically, the invention provides systems and methods for enabling unified communications capabilities in web-based, or other, applications by monitoring the outbound data stream within a server, using pattern recognition algorithms to detect unified communication data items, and inserting control codes into the outbound data stream that will enable the unified communications functions around those communication data items. These control codes may initiate communications programs that have been appropriately addressed to contact the person or entity associated with the communications data item. These control codes may also enable initiating application programs not used for communications.

1 Claim, 6 Drawing Sheets

310
Web Server Software Receives Request from Web Browser Application

320
Web Server Software Routes Request to Web-Based Application Program

330
Web-Based Application Generates HTML Data Stream including Communications Data Item in Response to Request

340
Web-Based Application Sends HTML Data Stream including Communications Data Item to Web Server Software

350
Unified Communications Monitor Plug-In Monitors HTML Data Stream Received by Web Server Software

360
Unified Communications Monitor Plug-In Passes Data Stream Through Pattern Recognition Engine

370
Unified Communications Monitor Plug-In Inserts Control Tags into Data Stream in Response to a Recognized Communications Data Item

380
Unified Communications Monitor Plug-In Returns Modified Data Stream to Web Server Software

390
Web Server Software Transmits Modified Data Stream to Web Browser Application

Fig. 3

Past Due List

| Name | Phone Number | Amount Due |
|---|---|---|
| Acme Anvil Co. | 4045551234 | |
| Auric Enterprises | 7705555678 | |
| Hanso Foundation | 6785551357 | |
| InGen LLC | 4045552468 | $45.54 |
| Tyrell Corp. | 7705555432 | $7890.98 |

Popup menu (440): Call, Email, IM, Acct. History

Fig. 4

```
<html>
    Acme Anvil Co.
    4045551234
</html>
```
500 — 510

Fig. 5a

```
<html>
function bbpucc () {...}
<a onClick=return (Acme Anvil Co.) >Acme Anvil Co.</a>
<a onClick=return (4045551234)>4045551234</a>
</html>
```
550 — 520

METHOD FOR AUTOMATICALLY ENABLING UNIFIED COMMUNICATIONS FOR WEB APPLICATIONS

FIELD OF THE INVENTION

The present disclosure relates generally to a method and system for unified communications capabilities, and more particularly, to a method and system for automatically enabling unified communication capabilities in an application program.

BACKGROUND

The integration of unified communications capabilities into an application program can lead to significant user productivity improvements. As the name suggests, unified communications unites different communications tools under a single control interface. An example of unified communications would be an interface that allows a user to "click-to-call," "click-to-email," and "click-to-instant message." In other words, a single interface allows the user to place a telephone call, perhaps using voice over IP (VoIP) technology, send an email message, or send a chat message using an instant messaging service, such as AMERICA ONLINE'S INSTANT MESSENGER.

Current unified communications solutions typically require a user or network administrator to set up a unified communications capabilities infrastructure, such as an email server, chat/awareness server, and VoIP server, and modify application programs to connect to this infrastructure. The existing solutions that require application modifications are often impractical because (1) users may not have access to the application source code; (2) users may not have skills to make such modifications; and (3) there is no standardization of unified communications capabilities application programming interfaces (APIs), which puts a heavy burden on the application developer that wants to provide a general unified communications solution.

Often, an application may include communication data items that is associated with typical communications. These communication data items, or communication "hot-spots," may include a person's name, a phone number, an email address, or a chat screen name.

What is needed are systems and methods for enabling unified communications capabilities in applications without the requirement to modify application programs to enable connecting to a unified communications capabilities infrastructure.

SUMMARY

The invention provides systems and methods for enabling unified communications capabilities in applications without the requirement to modify application programs to enable connecting to a unified communications capabilities infrastructure.

An aspect of the present invention provides a method for providing unified communications capabilities. This method includes the steps of monitoring, with a unified communications plug-in, data transmitted from a web-based application to a web server operating application to detect a hypertext markup language (HTML) data stream comprising a communications data item; retrieving a detected HTML stream; passing the detected HTML data stream to a pattern recognition engine that includes a pattern recognition algorithm; characterizing the communications data item with the pattern recognition engine; based on the characterization, automatically inserting into the HTML data stream a control code comprising an HTML instruction that enables initiating a communications application in response to actuating a control associated with the control code in a web browser application; and returning the modified HTML data stream to the web server operating application.

DETAILED DESCRIPTION OF EXEMPLARY EMBODIMENTS

The invention provides systems and methods for enabling unified communications capabilities in applications without the requirement to modify application programs to enable connecting to a unified communications capabilities infrastructure. Specifically, the invention provides systems and methods for enabling unified communications capabilities in web-based or other applications by monitoring the outbound data stream within a server, using pattern recognition algorithms to detect unified communication data items, and inserting control codes into the outbound data stream that will enable the unified communications functions around those communication data items. These control codes may initiate communications programs that have been appropriately addressed to contact the person or entity associated with the communications data item. These control codes may also enable initiating application programs not used for communications.

Figure 1:
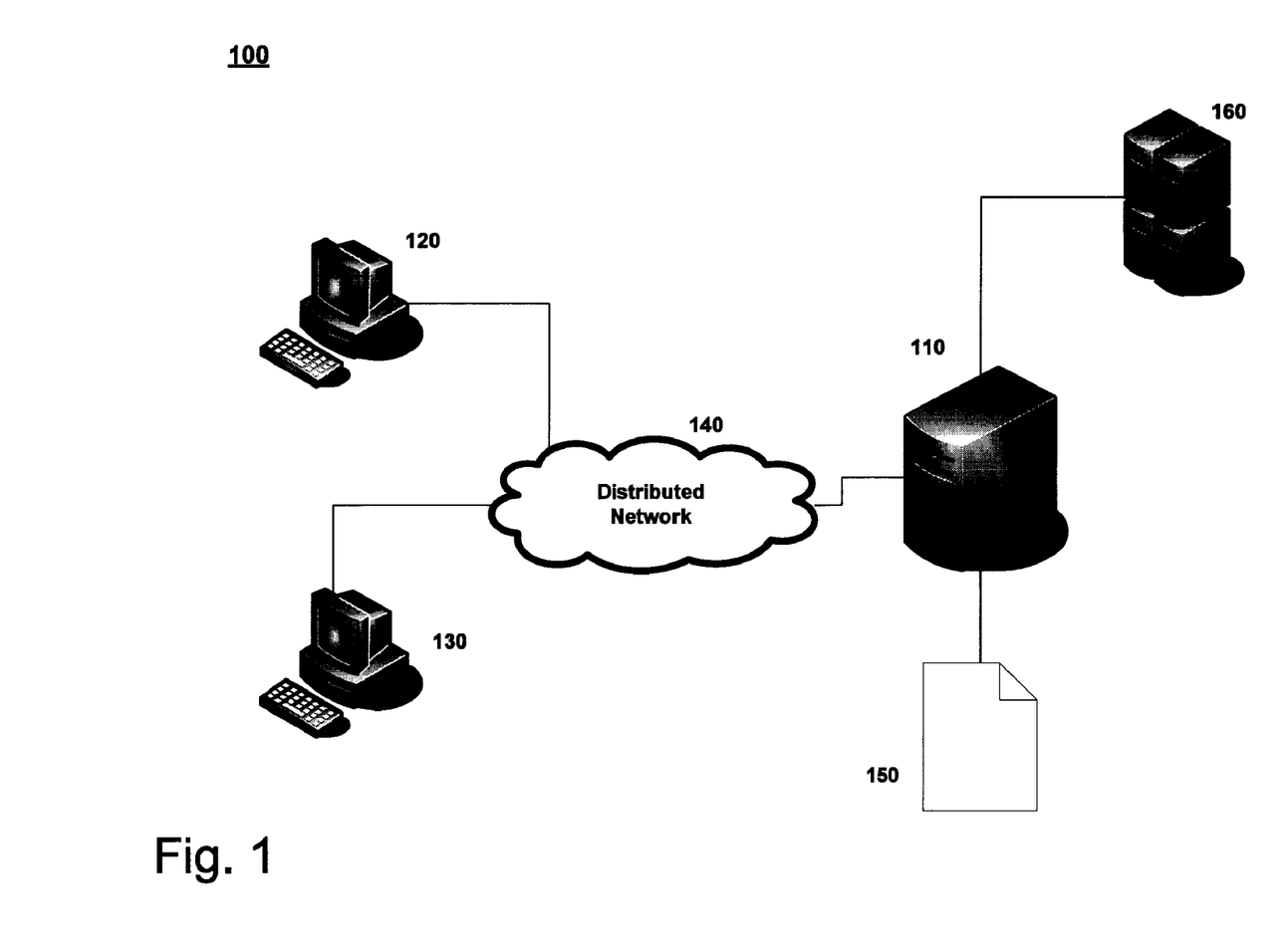
FIG. 1 depicts an operating environment in accordance with an exemplary embodiment of the present invention.

FIG. 1 depicts an operating environment 100 in accordance with an exemplary embodiment of the present invention. Referring to FIG. 1, a web server 110 is connected to a distributed network 140, such as the Internet. Connected to the web server 110 through the distributed network 140 are client devices, such as a personal computer 120 and a personal computer 130. Of course, any number of client devices may be connected to the web server 110 through the distributed network 140. These client devices may include other personal computers (not shown) and mobile communications devices (not shown).

The web server 110 is also connected to a web-based application program 150. The web-based application program 150 may reside on the web server 110 or on a different server, such as an applications server 160. Although this exemplary embodiment is in terms of "web" programs, the distributed network may be a local area network (LAN), private wide area network (WAN), or other network and is not restricted to the World Wide Web.

The web server 110 may include one or more application programs that provide communications capabilities, such as VoIP, email, and messaging programs. The web server 110 may be connected to additional hardware that supports these programs. Alternatively, this unified communications capabilities infrastructure may be associated with the applications server 160 or one or more other servers (not shown).

Figure 2:
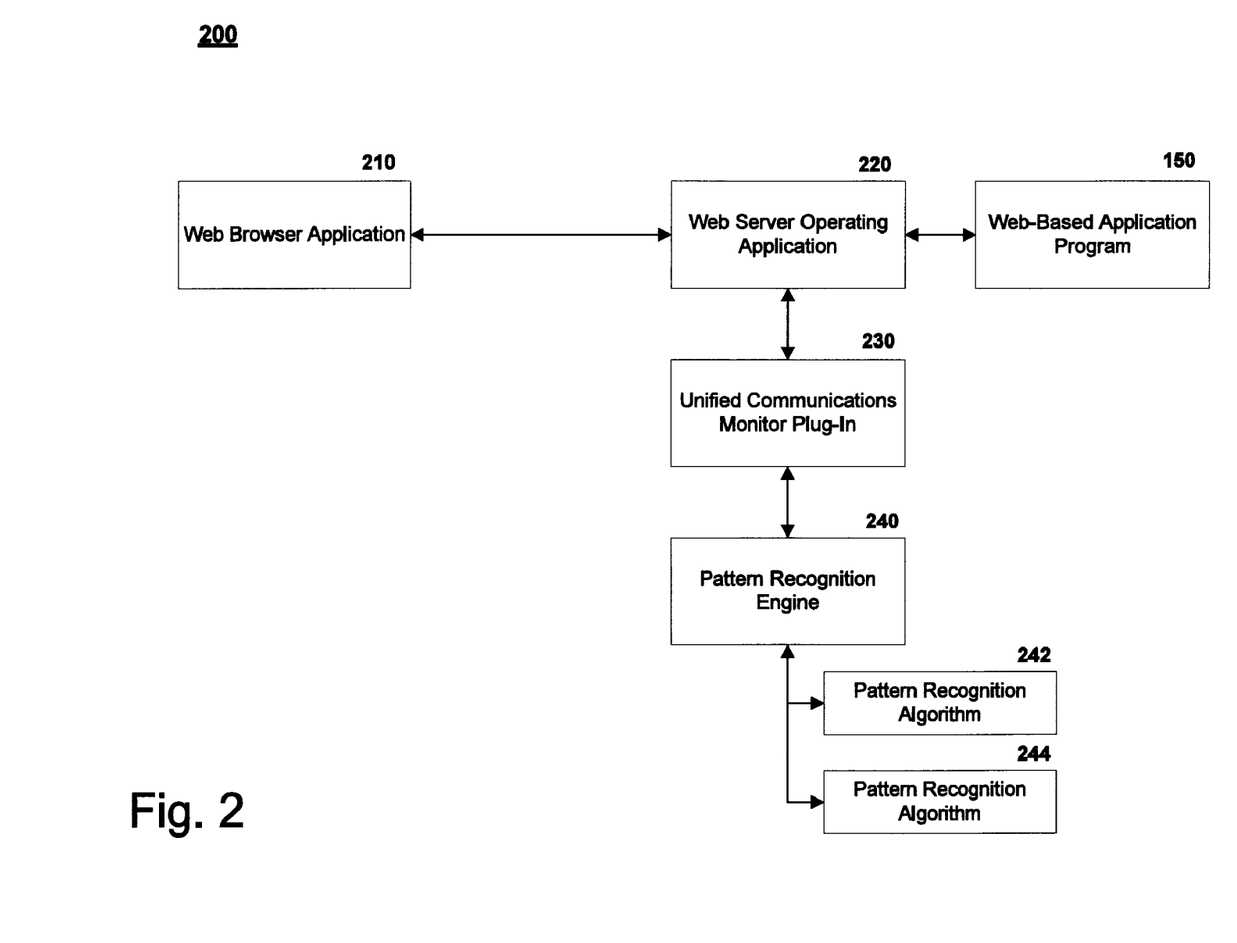
FIG. 2 depicts a general software architecture in accordance with an exemplary embodiment of the present invention.

FIG. 2 depicts a general software architecture 200 in accordance with an exemplary embodiment of the present invention. Referring to FIGS. 1 and 2, a web browser application 210, such as MICROSOFT'S INTERNET EXPLORER, resides on a client device, such as personal computer 120. The web browser application 210 interacts with a web server operating application 220, such as APACHE HTTP SERVER software, through the distributed network 140. The web server operating application 220 interacts with the web-based application program 150. The web server operating application 220 transmits requests from the web browser application 210 to the web-based application program 150.

The web server operating application 220 is also connected to a unified communications monitor plug-in 230. A plug-in is a software module that "plugs into," or is integrated into, another software program to provide specific functionality to that other program. In this exemplary embodiment, the unified communications monitor plug-in 230 "plugs into" the web server operating application 220. In an alternative embodiment, the unified communications monitor plug-in 230 may plug into the web browser application 210. Alternatively, the functionality of the unified communications monitor plug-in 230 could be integrated in the web server operating application 220 or web browser application 210 directly, rather than being characterized as a "plug in."

The unified communications monitor plug-in 230 monitors data streams sent from the web-based application program 150 to the web browser application 210 through the web server operating application 220. The unified communications monitor plug-in 230 monitors the data streams to identify communication data items. These communications data items may include names, phone numbers, email addresses, and chat room screen names. The unified communications monitor plug-in 230 may reside on the web server 110 or on a separate server (not shown) logically connected to the web server 110.

The unified communications monitor plug-in 230 includes a pattern recognition engine 240. The pattern recognition engine 240 applies pattern recognition algorithms, such as pattern recognition algorithm 242 and pattern recognition algorithm 244, to data streams monitored by the unified communications monitor plug-in 230. These pattern recognition algorithms evaluate the data streams to identify communications data items. For example, pattern recognition algorithm 242 may identify any seven or ten digit number as a telephone number. The pattern recognition algorithm 242 may ignore dashes in the data item or require that the data item have dashes or some other demarcation in the number string. In another example, the pattern recognition algorithm 244 may evaluate the data streams to identify data items with an "@" sign. The pattern recognition algorithm 244 may indicate that these data items are email addresses. The pattern recognition algorithm 244 may also require that the data item include a top level domain name after the "@" sign, such as ".com" or ".org."

The unified communications monitor plug-in 230 is further operable to modify a data stream to add control codes to the data stream when the unified communications monitor plug-in 230 identifies a communication data item within that data stream. As such, the unified communications capability can be provided to an application, such as the web browser application 210, without any modification to the web-based application program 150 itself. This aspect of the unified communications monitor plug-in 230 is discussed in greater detail below, in connection with FIGS. 5a and 5b.

Figure 3:
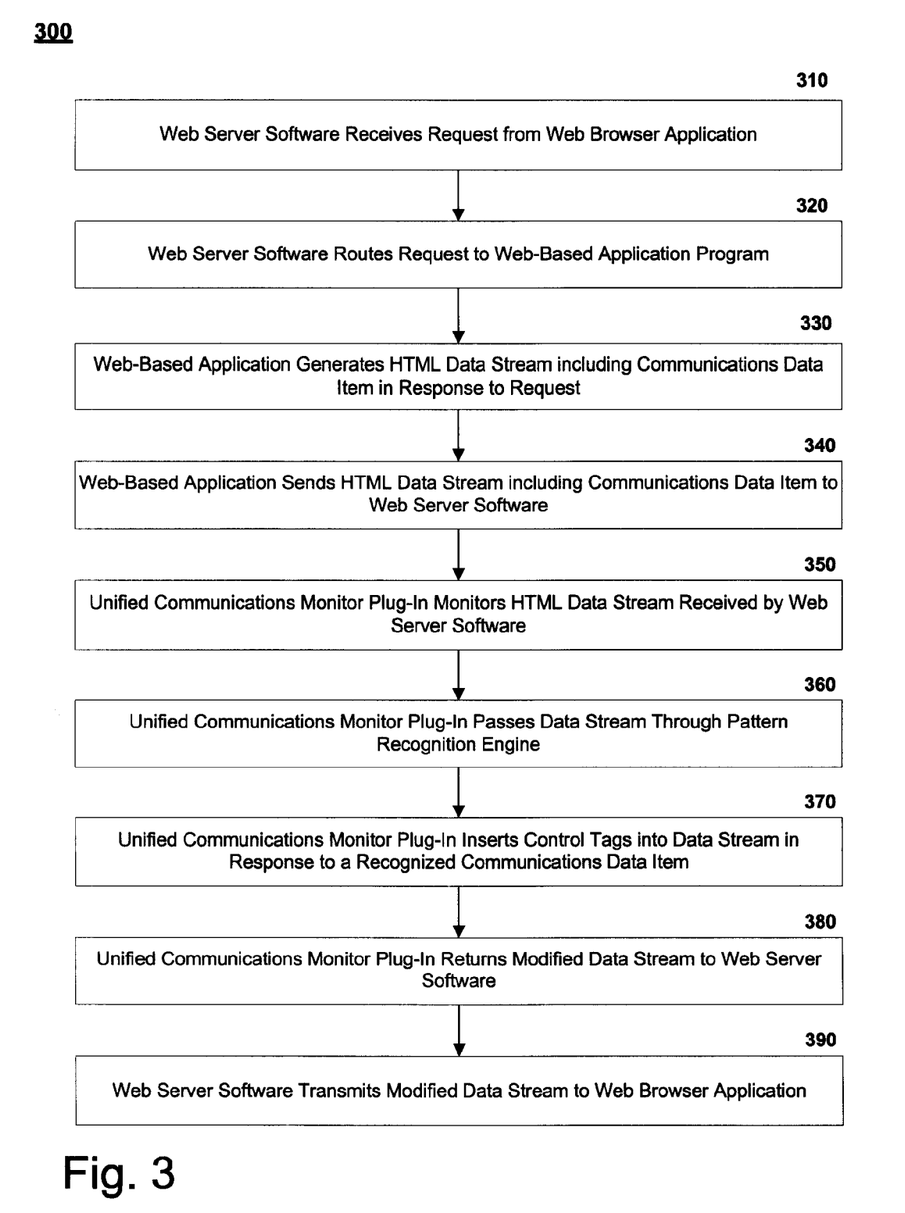
FIG. 3 provides a flow diagram for automatically enabling unified communication capabilities in accordance with an exemplary embodiment of the present invention.

FIG. 3 provides a flow diagram 300 for automatically enabling unified communication capabilities in accordance with an exemplary embodiment of the present invention. Referring to FIGS. 1, 2, and 3, at step 310, the web server operating application 220 receives a request from the web browser application 210. For example, the web browser application 210 may request a search of a database by entering a search term into the web browser application 210 or may retrieve a document by actuating a link associated with that document. At step 320, the web server operating application 220 routes the request to the appropriate web-based application program 150. At step 330, the web-based application program 150 generates a hypertext markup language (HTML) data stream in response to the request. Alternatively, the data stream my be an extensible markup language (XML) data stream or other form. This data stream may include one or more communications data items, such as a name, telephone number, email address, or chat room screen name.

At step 340, the web-based application program 150 sends the HTML data stream to the web server operating application 220. At step 350, the unified communications monitor plug-in 230 monitors the data streams sent to the web server operating application 220. When a data stream is detected, the unified communications monitor plug-in 230 retrieves the data stream and passes the data stream through the pattern recognition engine 240. The pattern recognition engine 240 applies one or more algorithms, such as pattern recognition algorithm 242 and pattern recognition algorithm 244, to the data stream to identify any communications data items. For example, the pattern recognition algorithm 242 may identify any string of seven or ten digits as a telephone number.

At step 370, the unified communications monitor plug-in 230 inserts control codes into the data stream. These control codes provide unified communications capabilities to the user through the web browser application 210. For example, these control codes may provide a control that can be actuated by pointing a mouse pointer at the control and clicking a mouse button. The actuating of the control would then initiate an appropriate communications process, such as initiating a telephone call over VoIP, opening an email, or initiating a messaging, or chatting, session, or other program. This capability is discussed on greater detail below, in connection with FIGS. 4, 5a, and 5b.

At step 380, the unified communications monitor plug-in 230 returns the modified data stream to the web server operating application 220. At step 390, the web server operating application 220 transmits the modified data stream to the web browser application 210.

Figure 4:
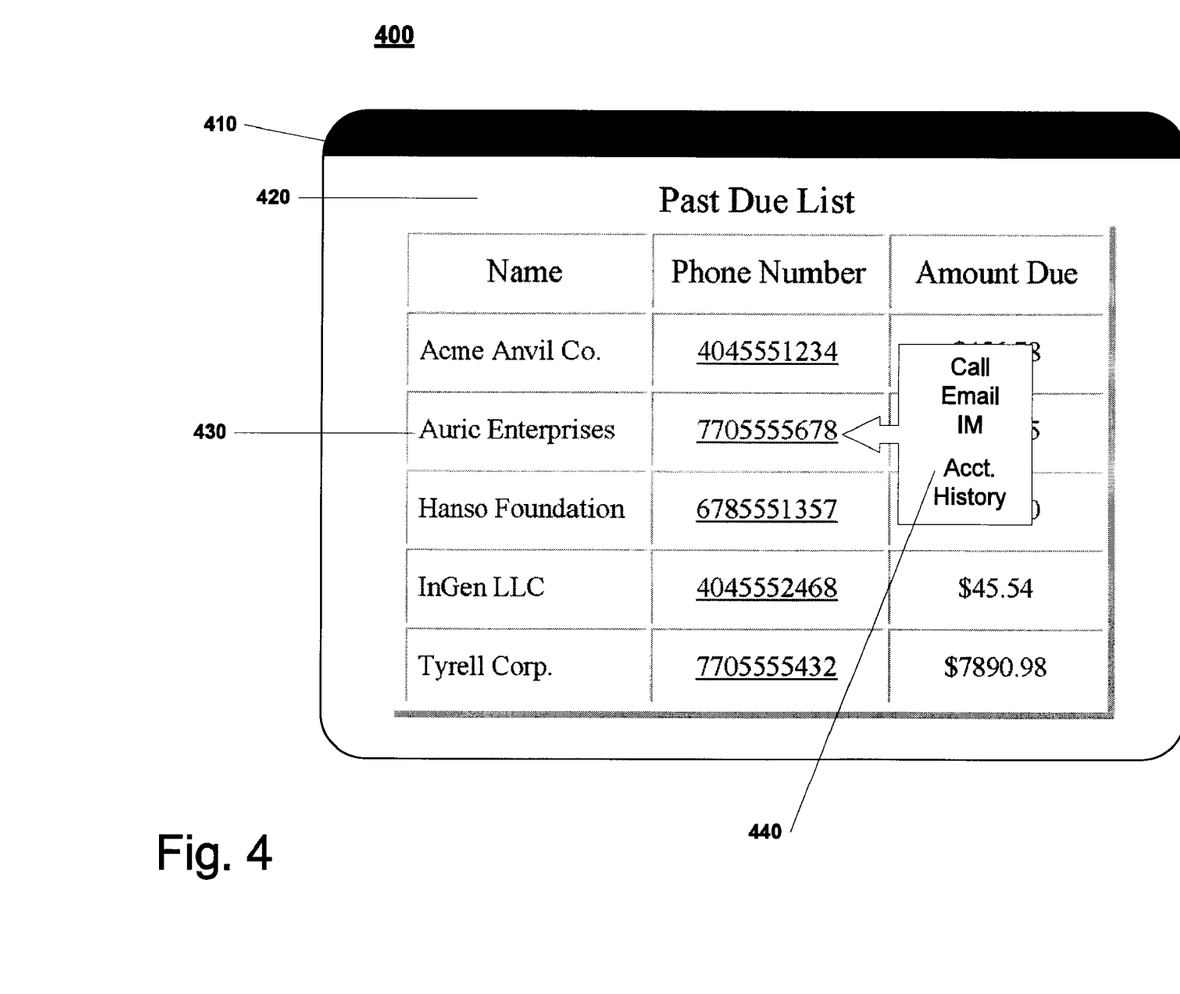
FIG. 4 depicts a screen image for a web browser application in accordance with an exemplary embodiment of the present invention.

FIG. 4 depicts a screen image 400 for a web browser application 210 in accordance with an exemplary embodiment of the present invention. Referring to FIGS. 1, 2, and 4, the web browser application 210 presents a screen 410. The screen 410 includes data 420 labeled "Past Due List." The data 420 represents information returned to the web browser application 210 from a web-based application program 150 through the web server operating application 220 in response to a request from the web browser application 210. For example, the web browser application 210 sends a request to the web-based application program 150 to retrieve the latest list of past due accounts. In response to that request, the web-based application program 150 sends a data stream containing the "Past Due List" to the web browser application 210 through the web server operating application 220, as modified by the unified communications monitor plug-in 230.

To continue with the example, for the entry 430 with a company name "Auric Enterprises," the unified communications monitor plug-in 230 has inserted control codes that can be operated by using a mouse to "click" on the phone number data item, "7705555678" in this example. The control codes may cause the phone number to be underlined, indicating that a unified communications capability is associated with that data entry. In alternative embodiments, the data item may be in a specific color or the data item may be presented without any indication or an indication that becomes evident when you mouse over the data item only.

In this exemplary embodiment, when a user uses a mouse to actuate the control, such as by clicking on the phone number data item "7705555678" for entry 430, a control 440 appears. The control 440 enables the user to initiate a phone call, such as by using a mouse to "click" on "Call" in control 440, initiate an email, such as by using a mouse to "click" on "Email" in control 440, or initiate a messaging session in a chat room, such as by using a mouse to "click" on "IM" in control 440. By actuating one of these controls, a request is sent to the web server operating application 220 or to a program resident on the user's computer, such as an email application, to initiate the communications.

The control 440 will have data associated with it to properly direct the communications. For example, the control may cause the web server operating application 220 to look-up a telephone number, email address, or screen name associated with the party. These data would be associated with the control 440 through the control codes entered by the unified communications monitor plug-in 230. For example, when a user actuates the "Email" control on the control 440 for entry 430, the web browser application 210 sends a request to the web server operating application 220 to look up the email address of "Auric Enterprises." The web server operating application 220 then returns the email address to the web browser application 210, which causes an email program to open a new email pane, with the email addressed with the email address of "Auric Enterprises."

The control 440 may also enable initiating other application programs. For example, control 440 includes an "Acct. History" control element. A user would "click" the "Acct. History" control element, such as by using a mouse, and cause the web server operating application 220 to initiate an accounting program to open a program record that shows the account history for "Auric Enterprises." The accounting program may reside on the web server 110 or on a different server, such as an applications server 160. In this way, the control 440 is not limited to enabling communications applications but instead can be used to initiate any application program.

Figure 5A:
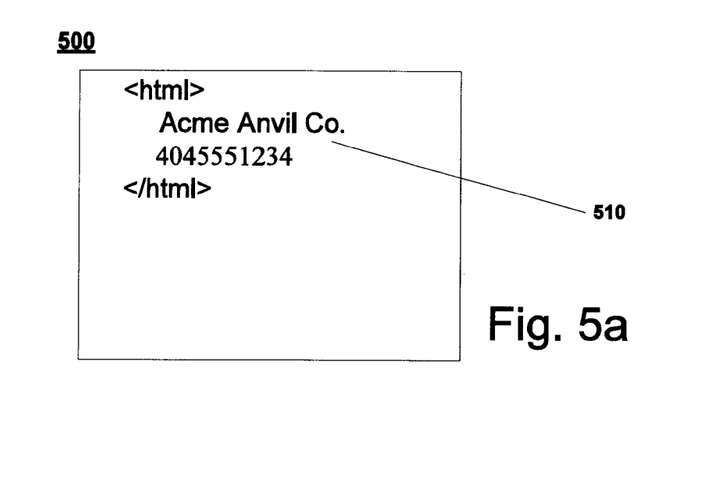
FIG. 5*a* depicts a data stream from a web-based application in accordance with an exemplary embodiment of the present invention.
Figure 5B:
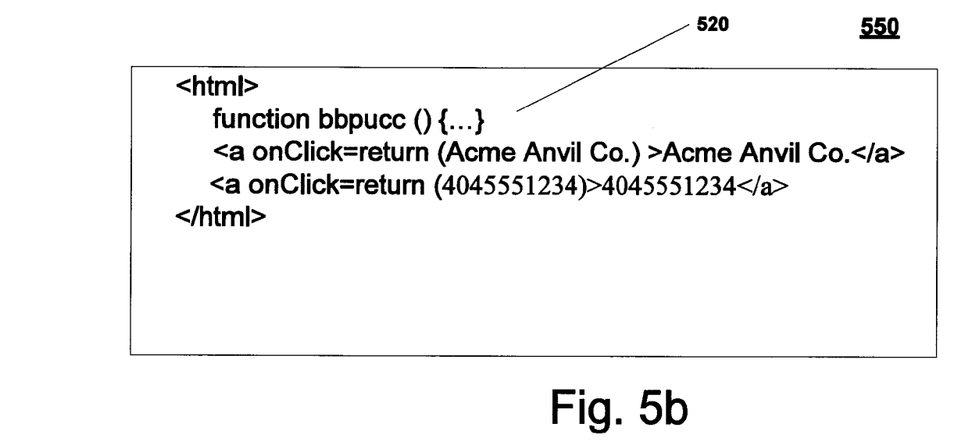
FIG. 5*b* depicts a modified data stream from a unified communications plug-in in accordance with an exemplary embodiment of the present invention.

FIG. 5a depicts a data stream 500 from a web-based application in accordance with an exemplary embodiment of the present invention. FIG. 5b depicts a modified data stream 550 from a unified communications plug-in in accordance with an exemplary embodiment of the present invention. Referring to FIGS. 2, 5a, and 5b the data stream 500 represents a data stream sent by a web-based application program 150 in response to a request by a web browser application 210. The data stream 500 includes communications data items 510, including a company's name ("Acme Anvil Co.") and a telephone number ("4045551234").

Data item 550 provides a modified data stream, including control codes 520. The control codes 520 identify a function ("bbpucc") that is initiated by "clicking" on the data item "Acme Anvil Co." or the data item "4405551234," such as with a mouse. These control codes, in conjunction with the function "bbpucc," provides the unified communications capability to the user's web browser application 210. In this exemplary embodiment, the function "bbpuuc" causes the web server operating application 220 to lookup the appropriate communications information (for example, phone number, email address, or messaging screen name) and initiate, as appropriate, programs that enable the communications, such as a VoIP program, an email program, or an instant messaging program in response to actuating a control.

In an alternative embodiment, not shown in FIGS. 5a and 5b, the unified communications monitor plug-in 230 may insert functions that enable initiating other (non-communications) programs. For example, a function may enable initiating an accounting program to retrieve payment histories for an identified entity. In another example, a function may access a human resources application program and open a human resources record for a person identified by the unified communications monitor plug-in 230. In this way, the disclosed invention can provide control codes that enable access to a variety of programs without the requirement to modify any of the application programs that can be accessed through the control.

Figure 6:
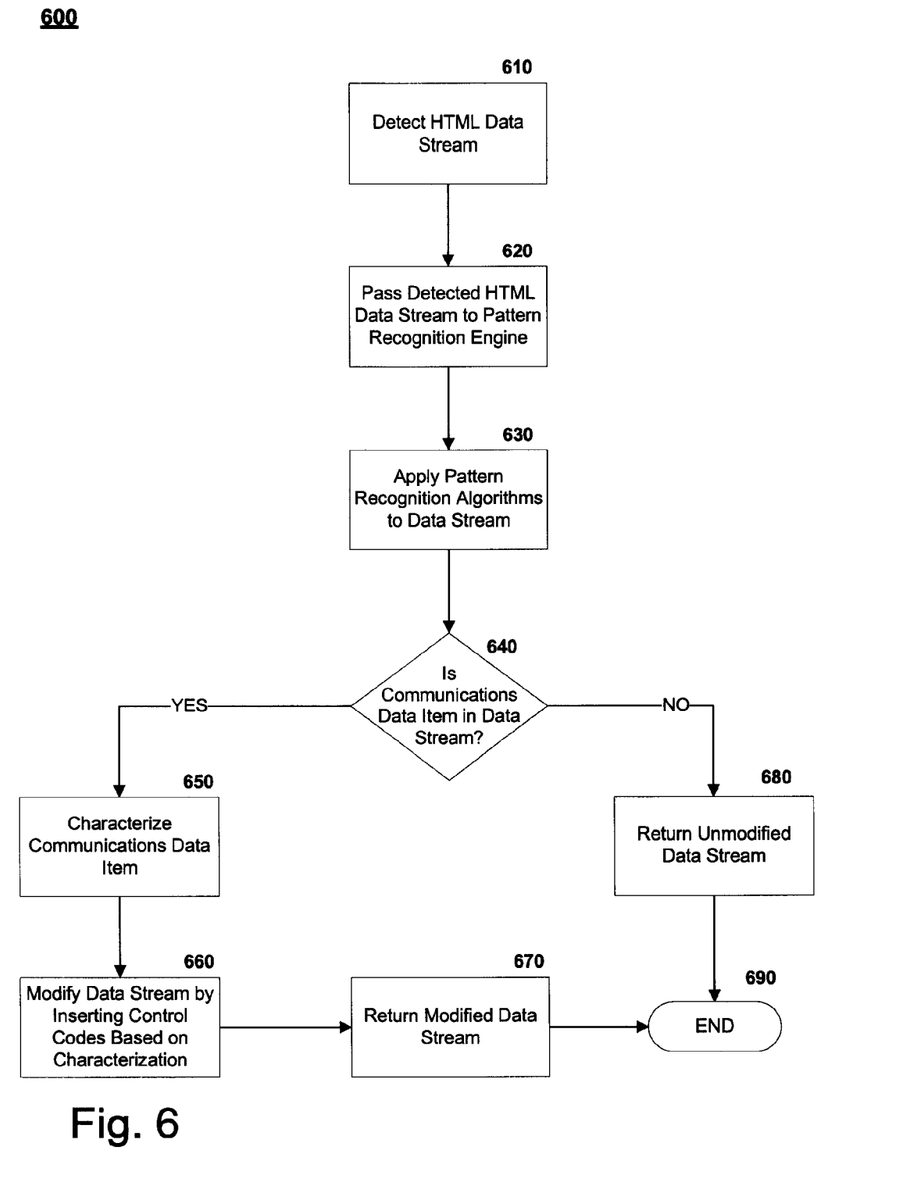
FIG. 6 provides a flow diagram for a unified communications monitor plug-in in accordance with an exemplary embodiment of the present invention.

FIG. 6 provides a flow diagram 600 for a unified communications monitor plug-in in accordance with an exemplary embodiment of the present invention. Referring to FIGS. 2 and 6, at step 610, the unified communications monitor plug-in 230 detects an HTML data stream as the data stream is transmitted from a web-based application 150 to a web server operating application 220. At step 620, upon detecting an HTML data stream, the unified communications monitor plug-in 230 retrieves the HTML data stream and passes the data stream to a pattern recognition engine 240.

At step 630, the pattern recognition engine 240 applies one or more pattern recognition algorithms, such as pattern recognition algorithms 242, 244, to identify any communications data items in the HTML data stream. The exemplary pattern recognition algorithms identify communications data items from the data stream by recognizing specific data patterns or features, such as a seven or ten digit data stream or a data stream with an "@" sign.

At step 640, the unified communications monitor plug-in 230 determines if any communication data items are present in the data stream. If the result at step 640 is "YES," then the unified communications monitor plug-in 230 moves to step 650 and characterizes the identified communications data items. For example, the communications data item may be characterized as a name, telephone number, email address, or screen name. At step 660, the unified communications monitor plug-in 230 modifies the data stream by inserting control codes associated with the characterization of the communication data items. An example of this step is illustrated above, in connection with FIGS. 5a and 5b. At step 670, the unified communications monitor plug-in 230 returns the modified data stream to the web server operating application 220. The process 600 then ends at step 690.

If the result at step 640 is "NO," then the unified communications monitor plug-in 230 moves to step 680 and the unified communications monitor plug-in 230 returns the unmodified data stream to the web server operating application 220. The process 600 then ends at step 690.

One of ordinary skill in the art would appreciate that the present invention provides systems and methods for enabling unified communications capabilities in applications without the requirement to modify application programs to enable connecting to a unified communications capabilities infrastructure. Specifically, the invention provides systems and methods for enabling unified communications capabilities in web-based or other applications by monitoring the outbound data stream within a server, using pattern recognition algorithms to detect unified communication data items, and inserting control codes into the outbound data stream that will enable the unified communications functions around those communication data items. These control codes may initiate communications programs that have been appropriately addressed to contact the person or entity associated with the communications data item. These control codes may also enable initiating application programs not used for communications.

What is claimed is:

1. A method for providing unified communications capabilities, comprising the steps of:

routing, by a web server operating application, a data request received from a web browser application to an appropriate web-based application;

monitoring, with a unified communications monitor plug-in, data transmitted from the web-based application to the web browser application via the web server operating application to detect a hypertext markup language (HTML) data stream comprising a communications data item;

retrieving a detected HTML data stream;

passing the detected HTML data stream to a pattern recognition engine, included in the unified communications monitor plug-in, comprising one or more pattern recognition algorithms;

characterizing the communications data item with the pattern recognition engine by applying the one or more pattern recognition algorithms to the detected HTML data stream;

based on the characterization of the communications data item, the unified communications monitor plug-in automatically inserting into the detected HTML data stream a control code comprising an HTML instruction that enables initiating a communications application in response to actuating a control associated with the control code in the web browser application;

returning, by the unified communications monitor plug-in, the modified HTML data stream to the web server operating application; and transmitting, by the web server operating application, the modified HTML data stream to the web browser application.

* * * * *